United States Patent
Zhu

(10) Patent No.: US 8,212,169 B2
(45) Date of Patent: Jul. 3, 2012

(54) LIGHT GUIDE PLATE, LIGHT GUIDE KEY PLATE AND METHOD FOR MANUFACTURING THE LIGHT GUIDE KEY PLATE

(75) Inventor: Zhaokan Zhu, Shenzhen (CN)

(73) Assignee: BYD Company Ltd. (CN)

( * ) Notice: Subject to any disclaimer, the term of this patent is extended or adjusted under 35 U.S.C. 154(b) by 398 days.

(21) Appl. No.: 12/521,547

(22) PCT Filed: Dec. 27, 2007

(86) PCT No.: PCT/CN2007/071349
§ 371 (c)(1),
(2), (4) Date: Jun. 26, 2009

(87) PCT Pub. No.: WO2008/080346
PCT Pub. Date: Jul. 10, 2008

(65) Prior Publication Data
US 2010/0326807 A1  Dec. 30, 2010

(30) Foreign Application Priority Data

Dec. 31, 2006 (CN) .................. 2006 2 0144552 U

(51) Int. Cl.
*H01H 1/10* (2006.01)
(52) U.S. Cl. ............................................. 200/515
(58) Field of Classification Search ......... 200/341–344, 200/512–517, 242, 253, 245, 294, 333, 282, 200/520–535
See application file for complete search history.

(56) References Cited

U.S. PATENT DOCUMENTS

| | | | | |
|---|---|---|---|---|
| 5,471,023 A * | 11/1995 | Kaizu et al. | .................. | 200/310 |
| 6,448,514 B1 | 9/2002 | Yeh | .................. | 200/5 A |
| 6,863,951 B2 * | 3/2005 | Sakai | .................. | 428/139 |

FOREIGN PATENT DOCUMENTS

| | | |
|---|---|---|
| CN | 1310085 A | 8/2001 |
| CN | 1449903 A | 10/2003 |
| CN | 1226855 C | 11/2005 |
| CN | 200993332 Y | 12/2007 |
| JP | 2003-308155 A | 10/2003 |

OTHER PUBLICATIONS

International Search Report, PCT/CN2007/071349, Apr. 3, 2008, 4 pages.

* cited by examiner

*Primary Examiner* — Edwin A. Leon
(74) *Attorney, Agent, or Firm* — Morgan, Lewis & Bockius LLP

(57) ABSTRACT

A light guide key plate includes a light guide plate (1). The light guide plate (1) has a plate body (11) with a plurality of keyholes (12). The plate body (11) is formed with flow passages (13) at one side thereof for communicating with the adjacent keyholes (12). The plate body (11) is also formed with overflow grooves (14) at one side thereof with the flow passages (13), and the overflow grooves (14) are extend inwardly from the edge of the plate body (11) and are communicated with the keyholes (12).

4 Claims, 2 Drawing Sheets

LIGHT GUIDE PLATE, LIGHT GUIDE KEY PLATE AND METHOD FOR MANUFACTURING THE LIGHT GUIDE KEY PLATE

CROSS REFERENCE TO RELATED APPLICATIONS

This Application is a United States National Stage Application filed under 35 U.S.C. §371 of PCT Patent Application Serial No. PCT/CN2007/071349 filed on Dec. 27, 2007, which claims priority of Chinese national application 200620144552.0 filed Dec. 31, 2006, the disclosures of both of which is hereby incorporated by reference in their entirety.

FIELD OF THE INVENTION

The present invention relates to the field of components for electronic products, and more particularly to a light guide plate and a light guide key plate with the light guide plate and a method for manufacturing the light guide key plate.

BACKGROUND OF THE INVENTION

Generally LED lamps in a mobile phone is covered by a light guide plate which may uniformly scatter the point source of light from the LED lamps, when a light ray passed through the light guide plate and reached a keyboard, the transmitted light ray is uniform. However, due to the light guide plate and the keyboard in the conventional mobile phone is separated with each other, and the keyboard is provided with several layers including a key pad, a key and a shading sheet in turn, thus after all components are assembled together, the total thickness of the keyboard is very high.

At present, a kind of light guide key plate has been found in the market, its manufacture process (also called Comolding process) is that firstly forming a light guide plate (usually made from polycarbonate plastic, thus it is also called polycarbonate plastic board, or briefly called PC board) with keyholes by injection moulding, and then placing the light guide plate in a mould for molding silica gel in high temperature and filling the silica gel into the keyholes to form keys. As a result, after sulfurized, the silica gel will be bonded together with the light guide plate, so as to form a light guide key plate. The light guide key plate is advantageous in that the point source of light from LED lamps can be uniformly emitted, because both silica gel and PC are transparent materials, so seen from the front of the keys, the transmitted light rays are uniform. Thus, the light guide key plate may not only play the role of light guide plate, but also be able to realize the functions of key pad. Meanwhile, the overall thickness of the light guide key plate is very low.

Moreover, in this light guide key plate, as shown in FIG. 1, the molded light guide plate 1 is formed with crisscross flow passages 13 between the different keyholes 12 at one side of the molded light guide plate. The flow passages 13 are favorable for uniform dispersing the silica gel during subsequent filling the silica gel into the keyholes so as to lead the surplus silica gel, thus the accumulation of the silica gel can be avoided. However, during the subsequent filling of the silica gel, this structure is unfavorable for the exhaust, and easy to cause that air bubbles exist in the light guide key plate. Moreover, if the silica gel is filled to much, the surplus silica gel will spread onto the surface of product to cause the overflow of silica gel, thus lower the quality of the light guide key plate.

SUMMARY OF THE INVENTION

The present invention is aim to provide a light guide plate which can avoid that air bubbles exist in a light guide key plate and silica gel is overflown.

Another purpose of this invention is to provide a light guide key plate having the light guide plate.

The other purpose of this invention is to provide a method for manufacturing the light guide key plate.

The light guide plate according to the present invention comprises a plate body formed with a plurality of keyholes, the plate body is formed with flow passages at one side thereof for communicating with the adjacent keyholes, wherein the plate body is also formed with overflow grooves at the one side thereof with the flow passages, the overflow grooves are extended inwardly from the edge of the plate body and are communicated with the keyholes.

The light guide key plate according to the present invention comprises a light guide plate and keys, the light guide plate comprises a plate body formed with a plurality of keyholes, the keys are arranged in the keyholes, the plate body is formed with flow passages at one side thereof for communicating with the adjacent keyholes, wherein the plate body is also formed with overflow grooves at the one side thereof with the flow passages, the overflow grooves are extended inwardly from the edge of the plate body and are communicated with the keyholes.

The method for manufacturing a light guide key plate according to the present invention includes the following steps: firstly producing a light guide plate by injection molding method, the molded light guide plate comprises a plate body formed with a plurality of keyholes, the plate body is formed with flow passages at one side thereof for communicating with the adjacent keyholes; then filling silica gel into the flow passages so that the silica gel will flow into the keyholes through the flow passages; and then sulfurizing the silica gel so that the flow passages will be fully filled with the silica gel and keys will be formed in the keyholes, thus the light guide key plate is finished; wherein, the plate body of the molded light guide plate is also formed with overflow grooves at the one side thereof with the flow passages, the overflow grooves are extended inwardly from the edge of the plate body and are communicated with the keyholes.

The light guide plate according to the present invention has the following advantages: because the plate body is formed with the overflow grooves which are communicated with the keyholes, when subsequent filling the silica gel, the air may be discharged through the overflow grooves, thus the air bubbles will not exist in the light guide key plate. Moreover, if the silica gel is filled too much, the surplus silica gel may be also discharged through the overflow grooves, thus the surplus silica gel will not spread onto the front face of the light guide key plate, therefore, the overflow of the silica gel will not occur.

DETAILED DESCRIPTION OF THE EMBODIMENTS

This invention will be described in detail in the following in combination with the drawings.

Figure 1:
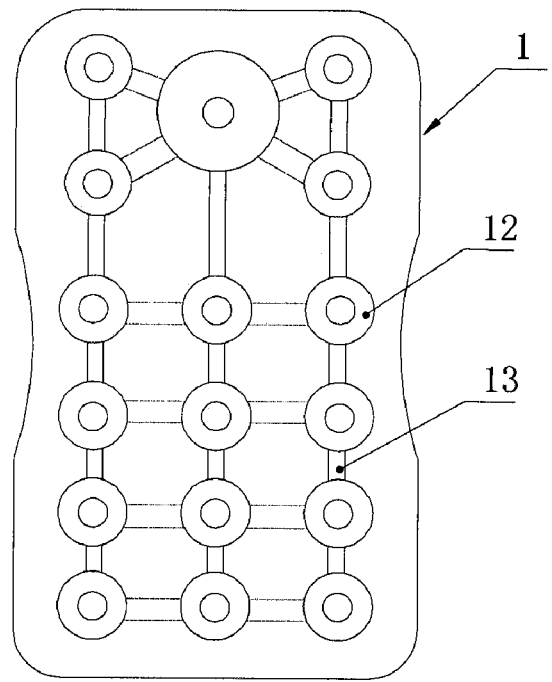
FIG. 1 is a schematic plan view of a light guide plate in prior art.
Figure 2:
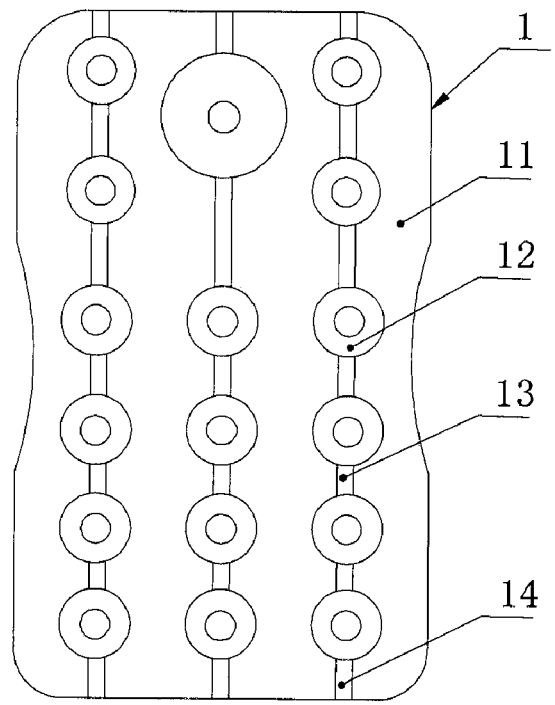
FIG. 2 is a schematic plan view of a light guide plate according to the present invention.

Referring to FIG. 2, the light guide plate 1, used for example a mobile phone, according to the present invention comprises a plate body 11 formed with a plurality of keyholes 12. The plate body 11 is formed with flow passages 13 at one side thereof for communicating with the adjacent keyholes 12, and the plate body 11 is also formed with overflow grooves 14 at the one side thereof with the flow passages 13. The overflow grooves 14 are extended inwardly from the edge of the plate body 11 and are communicated with the keyholes 12.

In order to ensure that the silica gel flow easier and smoother during the subsequent filling of silica gel, preferably, the flow passages 13 which are communicated with the same keyhole 12 are extended in the same direction. For example in FIG. 2, the flow passages 13 are extended along the longitudinal direction of the plate body 11 and are communicated with the keyhole 12. Moreover, both the flow passages 13 and the overflow groove 14 which are communicated with the same keyhole 12 are extended in the same direction. More preferably, both the flow passages 13 and the overflow groove 14 which are longitudinally extended are arranged along one beeline.

Considering the strength of the plate body 11 and the speed of overflowing of the silica gel, the depth of the overflow groove 14 is ⅓-½ of the thickness of the plate body 11.

With the light guide plate according to the present invention, the silica gel filled into the keyholes will be dispersed uniformly, while the surplus silica gel will be discharged through the overflow grooves, and the air will also be discharged through the overflow grooves simultaneously, thus the quality of the light guide key plate is improved.

Figure 3:
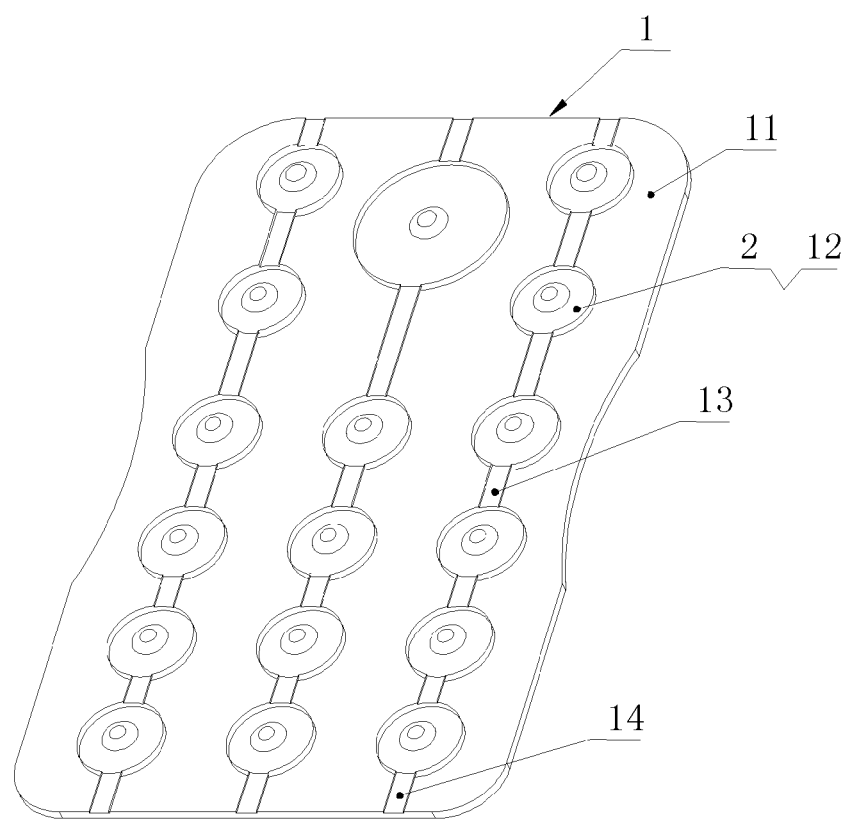
FIG. 3 is a schematic view of a light guide key plate according to the present invention.

Referring to FIG. 3, the light guide key plate according to the present invention comprises the light guide plate 1 and keys 2. The light guide plate 1 comprises the plate body 11 formed with a plurality of keyholes 12. The keys 2 are arranged in the keyholes 12. The plate body 11 is formed with the flow passages 13 at one side thereof for communicating with the adjacent keyholes 12, and the plate body 11 is also formed with the overflow grooves 14 at the one side thereof with the flow passages 13. The overflow grooves 14 are extended inwardly from the edge of the plate body 11 and are communicated with the keyholes 12. The further improved structure of the light guide plate 1 which has been described above is omitted for the purpose of conciseness.

The method for manufacturing the light guide key plate according to the present invention includes the following steps: firstly producing the light guide plate 1 by injection molding method, the molded light guide plate 1 comprises the plate body 11 formed with a plurality of keyholes 12, and the plate body 11 is formed with the flow passages 13 at one side thereof for communicating with the adjacent keyholes 12. Then filling silica gel into the flow passages 13 so that the silica gel will flow into the keyholes 12 through the flow passages 13. And then sulfurizing the silica gel so that the flow passages 13 will be fully filled with the silica gel and the keys 2 will be formed in the keyholes 12, thus the light guide key plate is finished. Wherein, the sulfurization is carried out at 40-60 Mpa pressure, 100-120° C. temperature, and 50-70s duration.

The plate body 11 of the molded light guide plate 1 is also formed with the overflow groove 14 at the one side thereof with the flow passages 13. The overflow grooves 14 are extended inwardly from the edge of the plate body 11 and are communicated with the keyholes 12. The further improved structure of the light guide plate 1 which has been described above is omitted for the purpose of conciseness.

Preferably, before filling the silica gel into the flow passages 13, treating the molded light guide plate 1 with ultraviolet rays beforehand to increase the surface energy of the light guide plate, so that the silica gel and the light guide plate can easier bond together. The condition for the treatment with the ultraviolet rays is that placing the light guide plate under the ultraviolet rays with the intensity of 800-1200 mJ/cm² for 1 to 5 minutes, preferably placing the light guide plate under the ultraviolet rays with the intensity of 1000 mJ/cm² for 2 minutes. It should be noted that the intensity of the ultraviolet rays may not be too high, otherwise, the light guide plate will become brittle and its strength will be reduced.

Preferably, after treating the molded light guide plate 1 with the ultraviolet rays, treating the molded light guide plate 1 with a silane coupling agent in rapid sequence, and then filling the silica gel. The condition for the treatment with the silane coupling agent is that coating the surface of the light guide plate with the silane coupling agent under the temperature of 20-25° C., humidity of 50-55 RHM, and then keeping the light guide plate for more than 12 h to volatilize a diluting agent in the silane coupling agent and ensure that the coupling agent can full reacted with the light guide plate. The silane coupling agent may be various conventional types such as C0431, 6361 produced by Japan Toshiba Organic Silicon Company.

Preferably, in order to fill the silica gel easily, placing the light guide plate 1 into a forming mould during the filling of the silica gel into the flow passages 13 of the light guide plate 1. When the forming mould is closed, the light guide plate is clamped tightly therein, and gaps are left at the flow passages only, thus the silica gel may be easily filled into the flow passages.

The invention claimed is:

1. A light guide plate, comprising:
a plate body having a longitudinal direction;
a plurality of keyholes;
a plurality of flow passages; and
a plurality of overflow grooves,
wherein
the keyholes, the flow passages, and the overflow grooves are formed on one side of the plate body into multiple columns, each column including multiple keyholes, flow passages, and overflow passages that are deployed along the longitudinal direction of the plate body such that:
each flow passage within in a respective column has two opposite ends that are connected to two adjacent keyholes within the same column and
each overflow groove within in a respective column extends inward from a respective edge of the plate body and is connected to an adjacent keyhole within the same column.

2. The light guide plate according to claim 1, wherein the depth of the overflow groove is between ⅓ and ½ of the thickness of the plate body.

3. A light guide key plate, comprising a light guide plate and a plurality of keys, wherein the light guide plate comprises:
a plate body having a longitudinal direction;
a plurality of keyholes;
a plurality of flow passages; and
a plurality of flow grooves, wherein:
- the keys are fixed in the keyholes; and
- the keyholes, the flow passages, and the overflow grooves are formed on one side of the plate body into multiple columns, each column including multiple keyholes, flow passages, and overflow passages that are deployed along the longitudinal direction of the plate body such that:
  - each flow passage within in a respective column has two opposite ends that are connected to two adjacent keyholes within the same column and
  - each overflow groove within in a respective column extends inward from a respective edge of the plate body and is connected to an adjacent keyhole within the same column.

4. The light guide key plate according to claim 3, wherein the depth of the overflow groove is between ⅓ and ½ of the thickness of the plate body.

* * * * *